United States Patent [19]

Thacker

[11] 4,016,918

[45] Apr. 12, 1977

[54] CLAMP IN VALVES

[75] Inventor: Stephen Ernest William Thacker, Lynn Stonnal, England

[73] Assignee: Scovill Manufacturing Company, Waterbury, Conn.

[22] Filed: May 14, 1975

[21] Appl. No.: 577,593

[30] Foreign Application Priority Data

May 21, 1974 United Kingdom ............ 22649/74
Aug. 28, 1974 United Kingdom ............ 37688/74

[52] U.S. Cl. .............................. 152/427; 152/415
[51] Int. Cl.² ........................................ B60C 29/00
[58] Field of Search ................. 152/415, 427–429, 152/431

[56] References Cited

UNITED STATES PATENTS

| 1,689,649 | 10/1928 | Wagenhorst | 152/428 |
| 2,277,885 | 3/1942 | Rodanet | 152/427 |
| 2,744,559 | 5/1956 | Leonetti | 152/427 |
| 2,872,963 | 2/1959 | Boyer | 152/427 |
| 3,536,119 | 10/1970 | Mayer | 152/427 |

Primary Examiner—Drayton E. Hoffman
Attorney, Agent, or Firm—Cushman, Darby & Cushman

[57] ABSTRACT

A clamp-in valve for a road vehicle which can be inserted and removed from the outside of the wheel instead of from the inside consists of a valve stem flanged at one end with a rubber grommet at that end, the grommet being flanged at its end remote from the valve stem flange, and retaining means for pressing on the flange of the grommet. The diameter of the flange of the valve stem is smaller than the diameter of the aperture of the wheel into which the valve is to be inserted. The retaining means can be washer and nut or a lock washer engaging in a groove or rib of the valve stem and held by, for example, a screw-on dust cap with an elongate skirt. The flanged end of the valve stem is inserted through the wheel aperture and the retaining means tightened so that the rubber grommet is compressed to seal and clamp the valve stem in the aperture. The valve may be used with tubeless tires or tubed tires having a modified rubber spud for attachment to the tube.

9 Claims, 13 Drawing Figures

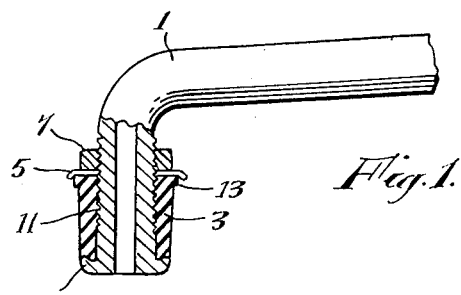
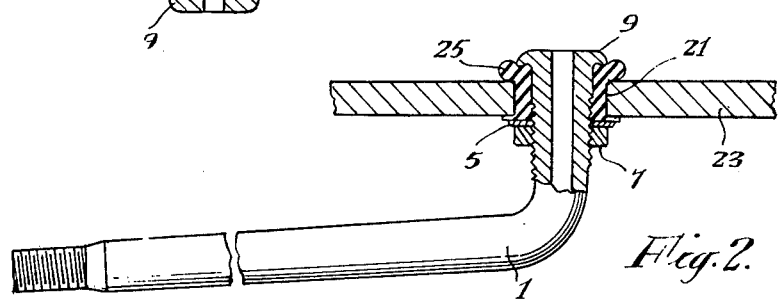
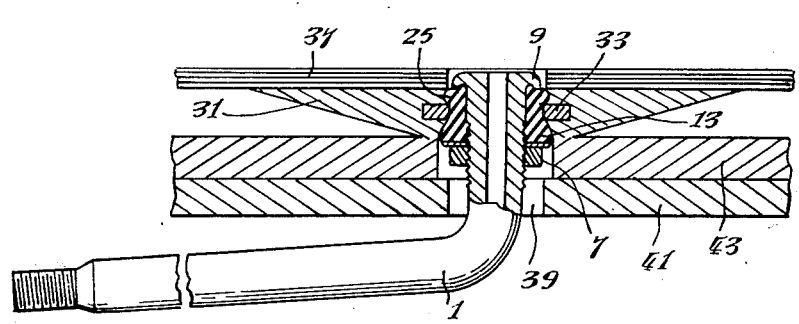
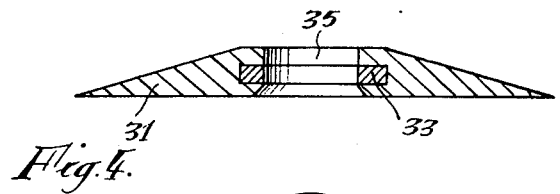
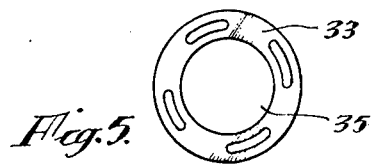

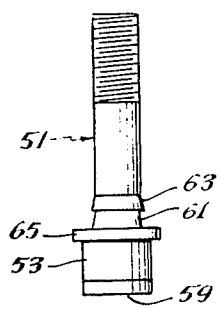
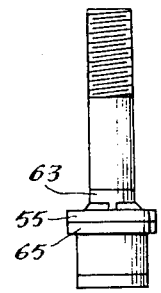
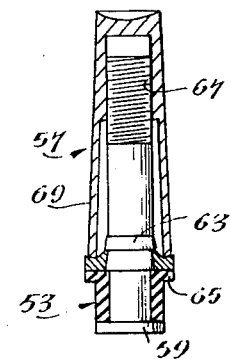
Fig.6.   Fig.7.   Fig.8.
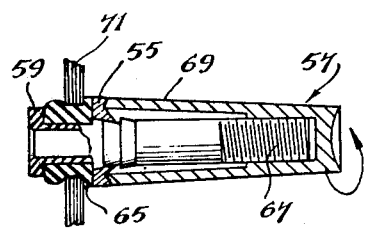
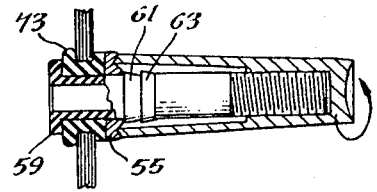
Fig.9.   Fig.10.
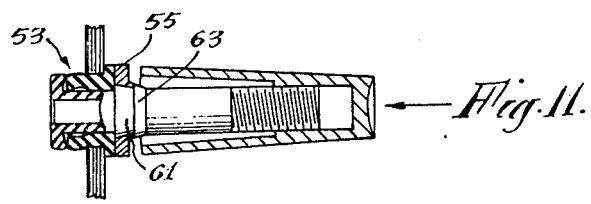
Fig.11.
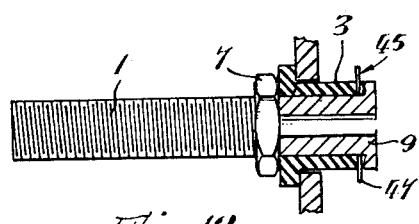
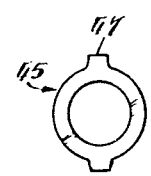
Fig.12.   Fig.13.

CLAMP IN VALVES

FIELD OF THE INVENTION

The present invention relates to a clamp-in valve primarily but not necessarily exclusively intended for use with a vehicle tire.

BACKGROUND TO THE INVENTION

A clamp-in type valve, which is conventionally used with tubeless tires, particularly on lorries or other heavy goods vehicles consists of a valve stem with a flange at one end, the stem being externally threaded at that end, a rubber grommet having a flange abutting the flange of the valve stem, a ring washer and a nut which is to be screwed onto the threaded stem to clamp the valve in position. The valve stem without the ring washer or nut is inserted from inside the wheel through an aperture in the wheel rim so that the flange on the grommet is trapped between the edge of the rim aperture and the flange on the valve stem, the latter being larger than the aperture. The ring washer is replaced and the nut is then threaded onto the stem from the outside of the wheel and screwed down so that the grommet, which projects from the aperture on the outside is compressed to seal the valve in the aperture and the valve stem is securely clamped in.

If the valve stem becomes damaged the stem can be replaced by unscrewing the nut to release the stem but the stem then has to be withdrawn from the aperture from the inside of the wheel rim, so that the tire has to be stripped from the wheel in order to get access to the inside.

SUMMARY OF THE INVENTION

It is an object of the present invention to provide a clamp-in type valve which can be inserted and removed from the outside, thus avoiding the need to strip the tire to change the valve stem.

According to the present invention there is provided a clamp-in valve which includes a valve stem having a flange at one end extending circumferentially of the stem, a grommet of elastomeric material around the stem abutting the flange, the grommet having a flange at its end remote from the flange of the stem and retaining means movable on the stem for retaining and compressing the grommet on attaching the valve to a vehicle wheel aperture, the diameter of the stem at the flange being less than that of the aperture into which the valve is to be clamped.

The size of the flange and grommet relative to the size of the aperture into which the valve is to be clamped is such that the flange end of the stem can be inserted through the aperture until the flange on the grommet abuts the edge of the aperture, the retaining means then being engaged so that the portion of the grommet at the other side of the aperture expands over the edge of the aperture and seals the aperture, the stem being secured in the aperture by this means. The stem may be removed by releasing the retaining means to release the pressure on the grommet so that the stem can then be pulled through the aperture. This valve may therefore be described as a "push-in" valve since it is inserted by pushing from the outside.

Preferably, the valve further includes a locking device at the flanged end of the stem, which locking device can be passed through the aperture on assembly and can prevent blow-out of the valve at high pressure. The locking device may be a spring steel washer having tabs deformable on inserting the valve through the aperture during assembly, the diameter of the washer at the tabs being greater than the diameter of the aperture the washer being trapped between the grommet and the flange of the stem.

A clamp-in valve within the present invention can be used with a tubeless tire, in which case the stem is clamped into an aperture of the wheel rim or alternatively it may be used with a tubed tire in which case a modified rubber spud has to be used. The rubber spud is a disc of rubber with a central aperture which is bonded to the outside of the tube. The spud is modified in that it contains a member of rigid material around the aperture which acts as a member into which a clamp-in valve according to the invention is clamped, the member having an aperture of greater diameter than the stem at the flange so that the stem can be inserted and removed.

In a particular embodiment which is suitable for use on lorries or heavy goods vehicles, a portion of the valve stem is externally threaded and the retaining means is a ring washer and a securing nut screw-threadedly engaging the externally threaded stem, the grommet being compressed to clamp the valve stem into the aperture by simply tightening the nut.

In an alternative embodiment, which is suitable for use in the tires of passenger cars and such vehicles, the retaining means is provided by a lock washer engaging in a circumferentially extending rib on the valve stem. In order to constrict the grommet, when the valve stem is positioned in the wheel rim aperture the lock washer is forced from its initial rest position into engagement with the rib which is positioned so that the grommet is compressed by the washer in this clamped position of the valve stem.

Preferably means are provided for urging the lock washer into the clamped position, for example a member screw-threaded to the stem and abutting the washer will, on rotation, force the lock washer into engagement with the rib. The member may conveniently be a dust-cap which is screw-threaded to the other end of the valve stem and which has a depending skirt for abutment with the lock washer.

Preferably there are two or more circumferentially extending ribs, the lock washer being engaged with that rib furthest from the flanged end of the stem in the uncompressed rest position of the grommet.

Preferably the or each rib is in the form of a conical serration on the valve stem, the lock-washer being pushed along the conically widening surface of the serration on tightening until it engages the shoulder of the serration.

Either embodiment of retaining means may be used with tubeless tires or with tubed tires using a modified rubber spud as described above.

According to one further aspect therefore, the invention also provides a tubeless tired wheel having an aperture in the wheel rim, and a valve as defined above clamped into the aperture, the size of the aperture being such that the flange end of the stem can pass through the aperture of the wheel rim and be sealed and clamped therein by expansion of the grommet within the rim hole on engagement of the retaining means.

According to an alternative further aspect, the invention also provides a tubed tire wheel having a spud bonded to the tube, the spud including a member of rigid material secured therein around a central aperture, and a valve as defined above extending through the wheel rim aperture and clamped into the spud, the size of the member in the spud being such that the flange end of the stem can pass through and be sealed and clamped therein by expansion of the grommet within the spud on engagement of the retaining means.

BRIEF DESCRIPTION OF THE DRAWINGS

FIG. 1 is a part-sectional view of part of a valve within the invention,

FIG. 2 shows the valve of FIG. 1 in use in a tubeless tired wheel,

FIG. 3 shows the valve of FIG. 1 in use in a tubed wheel,

FIG. 4 shows a spud for use with the embodiment of FIG. 3, and

FIG. 5 is a plan view of the preferred rigid member used in the spud of FIG. 4,

FIG. 6 is a view of a further embodiment of a partly assembled clamp-in valve,

FIG. 7 is a view of the valve of FIG. 6 with a lock washer,

FIG. 8 is a sectional view of the valve of FIG. 7 with a dust cap,

FIG. 9 is a sectional view showing the insertion of the valve of FIG. 8 into a wheel rim aperture of a tubeless tired wheel;

FIG. 10 shows the valve when fitted;

FIG. 11 shows the valve being removed,

FIG. 12 shows a further modification to a clamp-in valve, and

FIG. 13 is a plan view of a component of the valve of FIG. 12.

DESCRIPTION OF THE SPECIFIC EMBODIMENTS

A clamp-in valve shown in FIGS. 1 to 5 is intended for use on heavy goods vehicles and includes a valve stem 1 for housing a valve mechanism, which may be of any desired type, a rubber grommet 3, a washer 5, and a nut 7. The stem 1 has at one end a flange 9 which extends around the whole circumference of the stem. This end of the stem is also externally threaded at 11, the grommet 3 being trapped between flange 9 and washer 5. In its uncompressed state, as shown in FIG. 1, the grommet increases in diameter from the flange 9 towards the nut 7 and has a flange 13 at its end nearer the nut 7.

In effect, this arrangement of the grommet 3 is inverted relative to the conventional valve initially described and the flange 9 is of lesser diameter.

Referring now to FIG. 2, the valve stem as shown in FIG. 1 has been inserted through an aperture 21 in a wheel rim 23, flange end first, from below as viewed in the drawing, which is the outside of the wheel rim. Thus the flange 9 is of smaller diameter than aperture 21 but only slightly smaller, sufficient to allow the flange to pass through. When the valve has been pushed in so far that the grommet flange 13 abuts the outside edge of the aperture 21 (the increasing diameter of the grommet is preferably such that at this point it is substantially the same as the diameter of aperture 21) the nut 7 is tightened so that the stem with flange 9 is drawn out of the aperture, the flange 9 compressing the grommet 3 so that it expands to form a circumferential bulge 25 against the inner edge of the aperture 21. The valve stem is now sealed in the aperture 21 and clamped firmly therein by the grommet which is trapped between flange 9 and washer 5. The valve cannot be withdrawn from the aperture in this condition. To remove the valve, the nut 7 is unscrewed to release the compression of the grommet so that the stem can be pulled out of the aperture from the outside of the wheel rim, downwardly in the drawing. A new stem can be inserted in a similar way without needing to strip the tire. A lever tool may be required to remove the stem after some use.

Referring now to FIGS. 3, 4 and 5, a rubber spud 31 has a rigid member 33 with an aperture, preferably round, embedded in it around the central aperture 35. The member 33, as shown in FIG. 5 can be perforated so that the rubber of the spud extends through the perforations to mechanically assist the chemical bond of the member to the rubber.

As shown in FIG. 3 the spud 31 is bonded to the outer surface of the tube 37 of a tubed tire around an aperture in the tube and a valve as shown in FIG. 1 is passed through aperture 35 of the rubber spud 31. The diameter of the aperture in member 33 is such that the flange 9 can just pass through. The grommet flange 13 abuts on the outer surface of spud 31, when the nut 7 is next tightened so that the grommet 3, as described for FIG. 2 is compressed and forms a bulge 25 against the inner face of the member 33. The grommet also expands somewhat on the outer side of spud 31 against the rubber of the spud. The stem 1 is thereby sealed and clamped in the spud 31 against the rigid member 33. When the tube is positioned in the wheel, the stem 1 protrudes through a comparatively large aperture 39 in the wheel rim 41 and rim flap 43. As for the embodiment of FIG. 2, the stem e.g. if damaged, can be removed from the outside by unscrewing nut 7 to release the grommet and pulling out of the aperture, downwardly in the drawing. A new stem can similarly be inserted.

The valve stem 1 may be made of brass, which is used in the conventional tube type valves. However in the conventional valves, the stems are initially straight and can be bent by the supplier or the person assembling the tire to the wheel. In the present case, since the stem as a whole is attached to the spud in clamping engagement rather than chemical bonding it is possible to supply the stem already bent to the required shape, as shown in the drawings, thus saving the user the job of bending the stem, which eases tube stocking and permits simple valve replacement. This is advantageous from the users point of view and also opens up the possibility of making the stem of other materials such as plastics or die cast zinc or other metals which can be manufactured in the bent shape but which under normal circumstances do not lend themselves to mechanically bending or bonding to rubber easily.

The clamp-in valve illustrated in FIGS. 6 to 11 is intended for use on passenger cars and includes a valve stem 51 for housing a valve core mechanism, which may be of any desired type, a rubber grommet 53, a retaining means in the form of a lock washer 55 and a screw-threaded dust cap 57. The stem 51 has at one end a flange 59 which extends around the whole circumference of the stem. At a distance from the flange 59 the stem 51 also has two circumferential ribs 61, 63 in the form of conical serrations with their shoulders towards the flanged end 59.

As shown in FIG. 6 the grommet 53 lies around the stem 51 between the flanged end 59 and the nearer rib 61 and has a flange 65 at its end remote from flange 59.

The lock washer 55 then engages behind the shoulder of the further rib 63 and abuts the flanged end 65 of the grommet, as shown in FIG. 7 in its uncompressed rest position.

The other end of the stem 51 is externally threaded at 67 and the dust cap 57 is correspondingly internally threaded. As shown in FIG. 8 the dust cap 57 has a depending skirt 69 which abuts the upper surface of the washer 55. The arrangement of the grommet 53 is thus the same as that of grommet 3 in FIG. 1.

As shown in FIG. 9 the assembled valve is inserted through an aperture in the wheel rim 71 from the outside (the right-hand side of the drawing) the flange 59 being of lesser diameter than the aperture. The grommet flange 65 comes to abut the outside edge of the wheel rim aperture.

The cap 57 is then tightened as shown by the arrow so that the stem 51 is drawn outwardly of the aperture relative to grommet 53, washer 55 and cap 57. During this outward movement the washer 55 is held by the depending skirt 69 and slides over the conical face of rib 61 until, as shown in FIG. 10 it snaps into engagement with the shoulder of rib 61. This is generaly accompanied by an audible snap which indicates correct positioning.

This movement compresses the grommet 53 which is trapped in the aperture between flange 59 and washer 55 so that it expands to form a bulge 73 against the inside edge of the wheel rim aperture to seal and clamp the valve stem. This action of the dust cap is analogous to that of the nut 7 in the embodiment of FIG. 2.

The lock washer 55 is now held in the clamped position by its engagement with the rib 61. The cap 57 acts as a safety back-up to the washer 55 as well as sealing the valve core against dust and water.

If it is desired to remove the valve for replacement in the event of damage the cap 57 is unscrewed a few turns and the washer 55 is sheared by a blow on the cap end, as shown in FIG. 11. The grommet 53 is then released from compression and the valve can be pulled out of the rim aperture. A new stem can similarly be inserted without needing to strip the tire.

The stem 51 may be made of plastics material, the ribs 61, 63 being integrally moulded in the stem. Alternatively the stem may be of metal, and the ribs could be machined.

The cap 57 and washer 55 may also be of plastics material.

As described above the cap 57 with its skirt 69 is used as a tool by which the valve is clamped by washer 55, alternatively other means could be used to push the washer 55 into engagement with the rib 61 while compressing grommet 53.

The valve shown in FIGS. 6 to 11 can also be used with a modified rubber spud for a tubed tire, in which case it is fitted to the tire in the same way as described for the first embodiment with reference to FIGS. 3 to 5, the stem 51 and encircling dust cap 57 protruding through the wheel rim aperture as in FIG. 3.

FIGS. 12 and 13 illustrate a modification of a clamp-in valve, which although shown with a nut 7 as the retaining means could equally well be used with the lock washer 55 of the second embodiment described above. The modification is to incorporate a spring steel washer 45 between the flange 9 at the end of the valve stem 1 and the rubber grommet 3. The shape of the washer 45 is shown in FIG. 13. As shown in FIG. 12 the diameter of the washer at the tabs 47 is greater than the diameter of the aperture into which the valve is to be clamped. Since the washer 45 is of spring steel the tabs can deform sufficiently to allow the end of the valve to be pushed through the aperture (downwardly as viewed in the Figure) when assembling the valve by means of a tool whereupon the tabs spring back to assume their original position as shown in FIG. 12, the retaining nut 7 then being tightened to clamp the stem as described above. The purpose of the washer 12 is to act as a locking device to prevent the stem being blown out of the aperture under high pressure or other sudden forces. This may be important if, for example, the valve stem has not been properly inserted and clamped into the aperture when there could be a danger of blow-out at high speed, which does not occur if the valve is properly inserted. However, the use of the spring washer, or other equivalent locking means can guard against such an eventuality.

The modified valve can be removed for replacement if required by releasing the retaining means and pulling from the aperture with a force sufficient to deform the tabs of the washer, i.e. similar to that used to insert the stem initially. Such a force is of course greater than that which the valve has to withstand under all conditions of use on the vehicle wheel.

The ease of removal and replacement as compared with the conventional valve is clearly advantageous and allows the user of the vehicle to carry out a repair more quickly and simply.

The fact that the same valve stem can be used, as illustrated in FIGS. 2 and 3, both for tubeless and tubed tires is advantageous from the point of view of manufacture and stocking, since only one type of valve is required where two were previously required.

What is claimed is:

1. A clamp-in valve for sealing engagement with an aperture, the valve comprising a valve stem, a flange at one end of the valve stem extending circumferentially of the stem, a screw-threaded region on the stem remote from said end flange and a circumferentially extending rib on the stem at a region between said screw-threaded region and said flange and spaced from said flange, a lock washer on the stem for interference engagement with said stem rib, a grommet of elastomeric material round the stem and disposed between said lock washer and said stem flange, a flange on the grommet at its end remote from said stem flange, a screw-threaded member engaging said screw-threaded region of the stem for tightening down against such lock washer to urge it towards the stem flange, the diameter of the stem flange being less than that of the aperture into which the valve is to be clamped and the grommet being insertable into said aperture with the screw-threaded member and lock washer in a first position, said tightening-down of the screw-threaded member displacing the member and the lock washer from said first position towards the stem flange and forcing the lock washer into its interference engagement with said rib to bear on said grommet flange and compress the grommet to clamp the valve sealingly in the aperture.

2. A clamp-in valve as claimed in claim 1 in which the screw-threaded member is a dust-cap which engages said screw-threaded region of the valve stem and which has a depending skirt for abutment with the lock washer.

3. A clamp-in valve as claimed in claim 1 in which the valve stem has two or more circumferentially extending ribs, the lock washer being engaged with that rib furthest from the end flange of the stem in the uncompressed rest position of the grommet.

4. A clamp-in valve as claimed in claim 1 wherein the rib is in the form of a conical serration on the valve stem, comprising the conically widening surface and an end shoulder at the larger diameter end of said surface the lock-washer being pushed along the conically widening surface of the serration on tightening of the retaining means until it engages the end shoulder.

5. A clamp-in valve as claimed in claim 1 which further includes a locking device at the end flange of the stem.

6. A clamp-in valve as claimed in claim 5 in which the locking device is a spring steel washer having tabs, the diameter of the washer at the tabs being greater than the diameter of the aperture.

7. A vehicle wheel comprising a wheel rim having an aperture for the passage of an inflation valve and a tire on said wheel comprising an inner tube, and an outer cover, a spud bonded to said inner tube, an aperture in said spud registered with said wheel rim aperture, a rigid member in said spud surrounding said spud aperture, the inflation valve extending through the wheel rim aperture and being clamped in the spud aperture, said valve comprising a valve stem, a flange at the inner end of the valve stem and extending circumferentially of the stem, a grommet of elastomeric material around the stem adjacent the flange of the stem, the grommet having a flange at its end remote from the flange of the stem and retaining means movable on the stem for compressing the grommet to engage and retain the valve in the spud aperture, the size of the rigid member in the spud being such that the flange end of the stem can pass through and the stem be sealed and clamped therein by expansion of the grommet with the spud through its compression by the retaining means.

8. A clamp-in valve as claimed in claim 7 which further includes a locking device at the end flange of the stem.

9. A clamp-in valve as claimed in claim 8 in which the locking device is a spring steel washer having tabs, the diameter of the washer at the tabs being greater than the diameter of the aperture.

* * * * *